US007599430B1

(12) United States Patent
Andrews

(10) Patent No.: US 7,599,430 B1
(45) Date of Patent: Oct. 6, 2009

(54) FADING CHANNEL MODELING

(75) Inventor: David Andrews, Stenhousemuir (GB)

(73) Assignee: Xilinx, Inc., San Jose, CA (US)

( * ) Notice: Subject to any disclaimer, the term of this patent is extended or adjusted under 35 U.S.C. 154(b) by 699 days.

(21) Appl. No.: 11/352,038

(22) Filed: Feb. 10, 2006

(51) Int. Cl.
    *H04B 17/00* (2006.01)
(52) U.S. Cl. .................................................. 375/226
(58) Field of Classification Search ............... 375/224, 375/226, 227, 228, 259, 284, 285; 704/223, 704/225, 226
    See application file for complete search history.

(56) References Cited

U.S. PATENT DOCUMENTS

| 6,507,623 B1 * | 1/2003 | Gustafsson et al. | 375/285 |
| 6,606,593 B1 * | 8/2003 | Jarvinen et al. | 704/223 |
| 6,801,889 B2 * | 10/2004 | Walker | 704/226 |

OTHER PUBLICATIONS

El-Tanany et al. Analytical Modeling and Simulation of Phase Noise Interference in OFDM-Based Digital Television Terrestrial Broadcasting System, IEEE, vol. 47, No. 1, Mar. 2001, p. 20-31.*
Ou et al. Phase Noise Simulation and Estimation Methods: A comparative Study, IEEE, vol. 49, No. 9, Sep. 2002, p. 635-639.*
Fobes et al. Comparison of Phase Noise Simulation Techniques, IEEE, 2002, p. I-551-I-554.*
Marius F. Pop et al.; "Limitations of Sum-of-Sinusoids Fading Channel Simulators"; IEEE Transactions on Communications, vol. 49, No. 4; Apr. 2001; Copyright 2001 IEEE; pp. 699-708.

Gaston A. Arredondo et al.; "A Multipath Fading Simulator for Mobile Radio"; IEEE Transactions on Communications, vol. COM-21, No. 11; Nov. 1973; pp. 1325-1328.
Chengshan Xiao; "Rayleigh Channel Fading Simulator: Problems and Solutions"; University of Missouri-Columbia; Jun. 2002; pp. 1-28.
Rick Lyons; "How to Interpolate in the Time-Domain by Zero-Padding in the Frequency Domain"; available from http://www.dspguru.com/howto/tech/zeropad2.htm; downloaded on Feb. 9, 2006; pp. 1-4.
3GPP TS 25.101, V6.10.0 (Dec. 2005); Annex B; Technical Specification Group Radio Access Network; "User Equipment (UE) Radio Transmission and Reception (FDD)"; 3rd Generation Partnership Project; pp. 1-27.
3GPP TS 25.104, V6.11.0 (Dec. 2005); Annex B; Technical Specification Group Radio Access Network; "Base Station (BS) Radio Transmission and Reception (FDD)"; 3rd Generation Partnership Project; pp. 1-66.

(Continued)

*Primary Examiner*—Sam K Ahn
(74) *Attorney, Agent, or Firm*—W. Eric Webostad; Thomas George

(57) ABSTRACT

Simulation of noise and, more particularly, a coefficient generator for channel modeling, is described. A spectrum memory is for storing sets of constants for respective harmonics. At least one phase noise source is configured for generating phase noise. An Inverse Fourier Transform block is coupled to the spectrum memory and to the at least one phase noise source. The Inverse Fourier Transform block is configured to provide a read address to the spectrum memory for accessing at least one constant of a set of constants of the sets of constants from the spectrum memory and coupled to receive the phase noise from the at least one phase noise source.

20 Claims, 16 Drawing Sheets

OTHER PUBLICATIONS

3GPP TR 25.943, V6.0.0 (Dec. 2004); Technical Specification Group Radio Access Networks; "Deployment Aspects"; 3rd Generation Partnership Project; pp. 1-13.

IEEE 802.16.3c-01/29r4; Jul. 16, 2007; "Channel Models for Fixed Wireless Applications"; IEEE 802.16 Broadband Wireless Access Working Group; pp. 2-36.

* cited by examiner

FADING CHANNEL MODELING

FIELD OF THE INVENTION

One or more aspects of the invention relate generally to simulation of noise and, more particularly, to noise shaping for simulating a fading channel.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

Heretofore, channel models, such as those used in wireless or over-the-air communication systems, have been used to evaluate communication system performance in sub-optimum channels and in comparison with one or more channel models defined for a system specification. Another application for channel models includes determining a bit error rate ("BER") measurement of error-correcting encoders and decoders. Conventionally, use of channel models has involved simulating the transport of large amounts of data through a communication system and one or more channel models as done in software. Runtime for such prior simulations is significant.

Accordingly, it would be desirable and useful to provide a channel model that facilitates simulation in hardware to reduce simulation runtime. Furthermore, it would be additionally desirable and useful to provide means for multi-path fading channel modeling for determining system performance in a real-time simulation environment.

SUMMARY OF THE INVENTION

One or more aspects of the invention generally relate to simulation of noise and, more particularly, to noise shaping for simulating a fading channel.

An aspect of the invention is a coefficient generator for channel modeling. A memory is for storing sets of constants for respective harmonics. At least one phase noise source is configured for generating phase noise. An Inverse Fourier Transform block is coupled to the memory and to the at least one phase noise source. The Inverse Fourier Transform block is configured to provide a read address to the memory for accessing at least one constant of a set of constants of the sets of constants from the memory and coupled to receive the phase noise from the at least one phase noise source.

Another aspect of the invention is a method for generating coefficients for channel modeling. A coefficient generator is instantiated in an integrated circuit (IC) having programmable logic, the instantiating including programming the programmable logic. The coefficient generator is configured to generate phase noise; filter the phase noise to band pass a portion of the phase noise responsive to a Doppler frequency; obtain constants from memory, the constants obtained for respective sample points of a harmonic; and perform an Inverse Discrete Fourier Transform responsive to the phase noise and the constants.

Yet another aspect of the invention is a method for generating coefficients for channel modeling. A coefficient generator is instantiated in a programmable logic device, the instantiating including programming programmable logic. The coefficient generator is configured to generate phase noise, obtain constants from memory, the constants obtained for respective sample points of a harmonic; perform an Inverse Discrete Fourier Transform responsive to the phase noise and the constants to provide a noise shaped response in a time domain; and interpolate the noise shaped response between pairs of the sample points to provide a simulation of at least one channel in a communication system.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
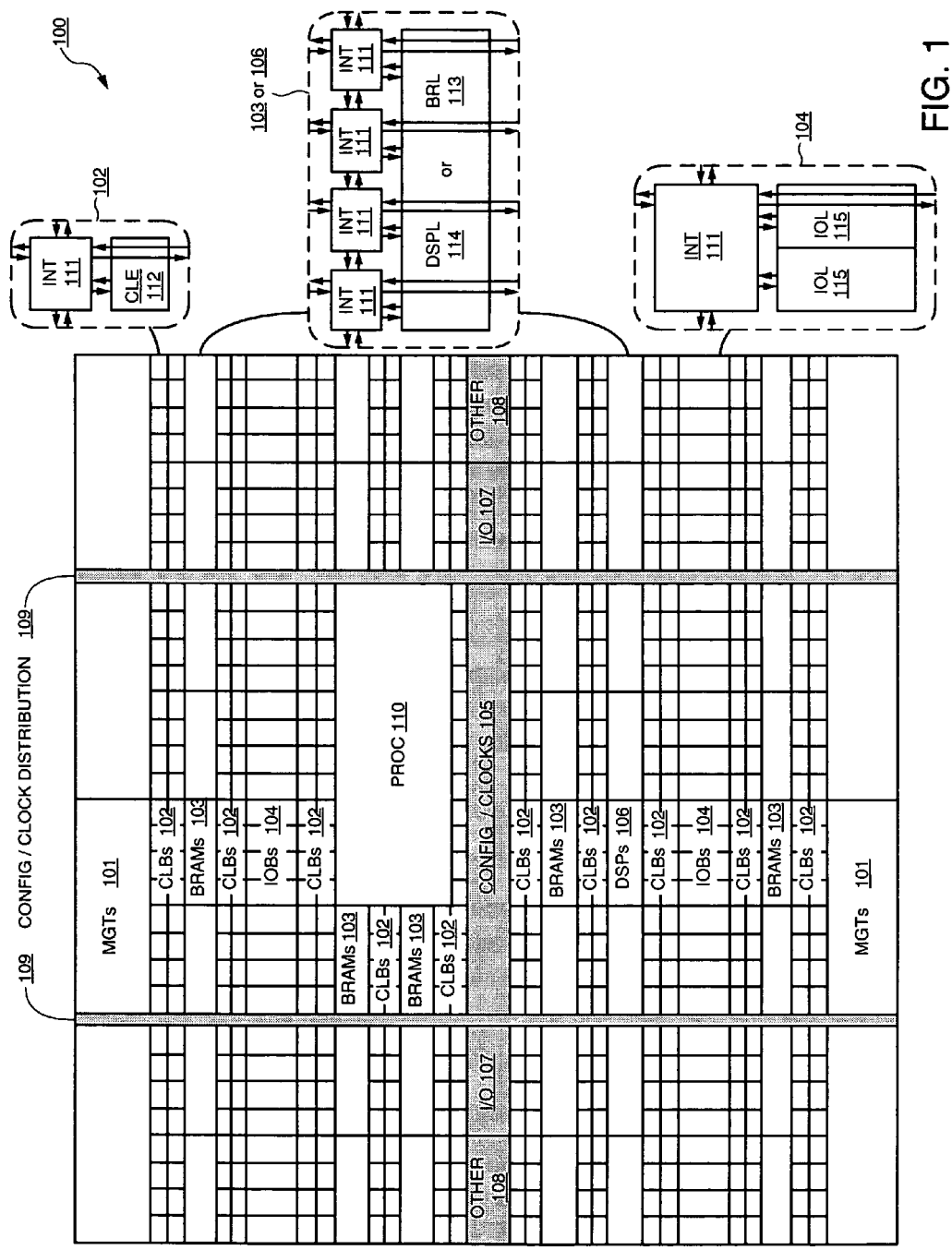
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Figure 2:
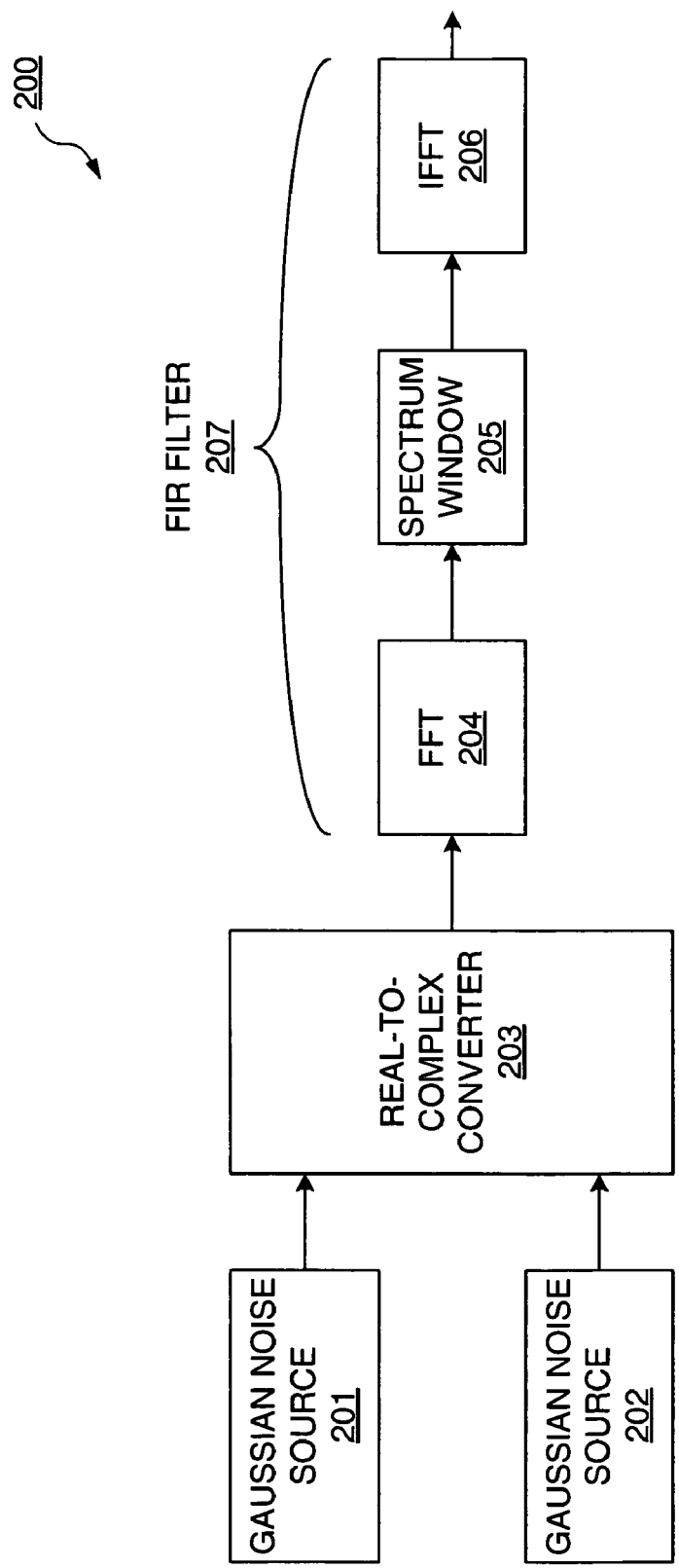
FIG. 2 is a block diagram depicting an embodiment of a noise filtering system.

FIG. 2 is a block diagram depicting an embodiment of a noise filtering system 200. Noise filtering system 200 is a known system including Gaussian noise sources 201 and 202, real-to-complex converter 203, Fast Fourier Transform ("FFT") block 204, spectrum window 205, and Inverse Fast Fourier Transform ("IFFT") block 206. In system 200, complex Gaussian noise is generated from two independent Gaussian noise sources 201 and 202. Each of these Gaussian noise sources provides a real, as opposed to imaginary, source component. Though two Gaussian noise sources are illustratively shown, it should be appreciated that a single Gaussian noise source may be used.

Gaussian noise sources 201 and 202 provide independent identically distributed ("IDD") random variables. Outputs from Gaussian noise sources 201 and 202 are provided to real-to-complex converter 203. For Gaussian noise source 201 having an output which may be mathematically described $X_k$, and Gaussian noise source 202 having an output which may be mathematically described as $Y_k$, real-to-complex converter 203 produces an output which is a summation of outputs from Gaussian noise sources 201 and 202, but with one of those real components being the imaginary portion of a complex signal. Such output of real-to-complex converter 203 may be mathematically described as $X_k+jY_k$.

Output of real to complex converter 203 is provided to FFT block 204 of Finite Impulse Response ("FIR") filter 207, which also includes spectrum window 205 and IFFT block 206. Notably, although a FIR filter is described, an Infinite Impulse Response ("IIR") filter may be used. Output of FFT block 204 may be mathematically expressed as:

$$z(n) = \sum_{k=0}^{M-1} (X_k + jY_k)W_N^{kn}, \quad (1)$$

where z(n) is an FFT output as a function of an output sample number, n. N is the length of the FFT, M is a number of sample points in an FFT, and $W_N$ is for FFT "twiddle" factors, namely $W_n$ is equal to $e^{-j2\pi/N}$. For purposes of clarity by way of example and not limitation, numerical values may help elucidate what is happening. For example, 64 complex time domain samples may be translated to the frequency domain via FFT block 204. Such transformed noise may be filtered by windowing against a discrete version of a user-selected spectrum. Notably, the number of points, namely 64 in this example, is the value of M.

Examples of spectrums which may be used for such windowing include a Clarke's spectrum or a Jake's spectrum, sometimes referred to as a Classic spectrum. Another spectrum which may be used is a Rounded spectrum. Rounded spectrums may be used for example for radio lengths when antennas are stationary, such as for broad band wireless access, such as WiMax. Yet another spectrum is an Impulse spectrum, which may be used to model single paths, namely paths which do not have fading but do have a Doppler shift. Furthermore, one may use different spectrums to model each respective path link of a two-path link. For example, one path link may be modeled for a Classic spectrum and another path link may be modeled for an Impulse spectrum for synthesizing Rician fading. Other examples of spectrums and combinations thereof may be used. Moreover, symmetric or asymmetric spectrums may be used.

FIR filter 207 has at least two drawbacks. First, each of the paths, where for example 64 terms are combined to form a radio path, uses a relatively large point sample buffer, which represents a significant amount of memory overhead. Notably, the term path may refer to discrete radio propagation paths in a channel. The N points (e.g., 64 points) in an FFT form one path. If a multipath channel has P paths, then the FFT is used P times, each use with N points. Secondly, FIR filter 207 uses multiple input samples, such as 64 in the above example, to generate each burst of a number of output samples, such as 8,192 output samples. This leads to discontinuities between output bursts when inputs to IFFT 206 change. To overcome these discontinuities when implementing filters in the frequency domain, an overlap-save or overlap-add form of buffering is used to mitigate against these discontinuities, but this type of mitigation adds complexity and overhead. Accordingly, a simpler noise filtering system than noise filtering system 200 would be both desirable and useful. Notably, though examples of 64 points and 8,192 output samples are used, it should be understood that other numbers of points and samples may be used. However, it should be understood more generally that the size of an IFFT is substantially greater than the size of an FFT. Moreover, large FFTs/IFFTs may have significantly large buffers.

A first level of overhead reduction to noise filtering system 200 would be to remove FFT block 204. For this FFT with random data input, it may be seen as a summation of independent random variables with identical distributions. Viewing an FFT in this manner, the Central Limit Theorem is applicable. Basically, the Central Limit Theorem states that the sum of equally distributed independent random variables, with finite variance, will approach a Gaussian distribution as the number of variables summed approaches infinity. Accordingly, output of FFT block 204 will be a Gaussian distribution. Thus, FFT block 204 may be removed and a scaling term left in its place.

Figure 3A:
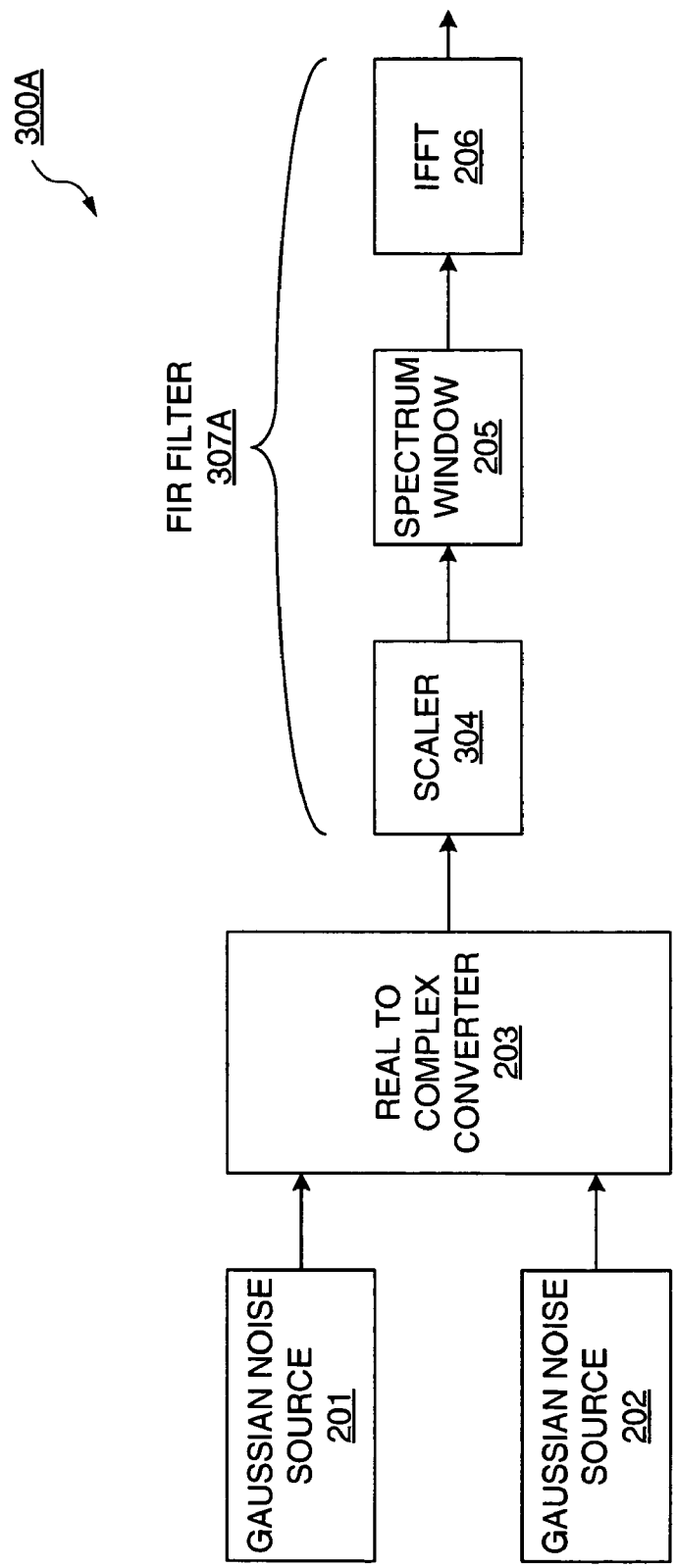
FIGS. 3A, 3B, 3C, 3D, 4A, 4B, and 5 are block diagrams depicting alternative exemplary embodiments of a noise filtering system.

FIG. 3A is a block diagram depicting an exemplary embodiment of a noise filtering system 300A. Noise filtering system 300A has a FIR filter 307A which replaces FIR filter 207 of FIG. 2. More particularly, in FIR filter 307A, FFT block 204 of FIR filter 207 of FIG. 2 is eliminated and replaced with scaler 304. Thus, real-to-complex converter 203, though outputting samples in time, is effectively treated as outputting samples in the frequency domain. By removing FFT block 204 of FIG. 2 and replacing it with scaler 304, the complexity of noise filtering system 300A is less than that of noise filtering system 200 of FIG. 2 for example. The scaling factor is the square root of N, where N is the length of the FFT. In the above example, N is equal to 64, so the scale will equal the square root of 64, namely 8 in the above example. For an integer scaling, scaler 304 may be implemented as a bit shifter. However, if N is equal to a number that does not have a discrete value, such as N equal to 128 with a square root of 11.314, the scalar may be reduced to the square root of N multiplied by the square root of 2 for implementing scaler 304.

Generalizing the above example, if N is equal to $2^{2m}$, scaler 304 may be a fixed shift of m, for m a positive integer. If, however, N is equal to $2^{(2m+1)}$, then a fixed shift of m followed by multiplication of the square root of 2 by a constant may be used.

Figure 3B:
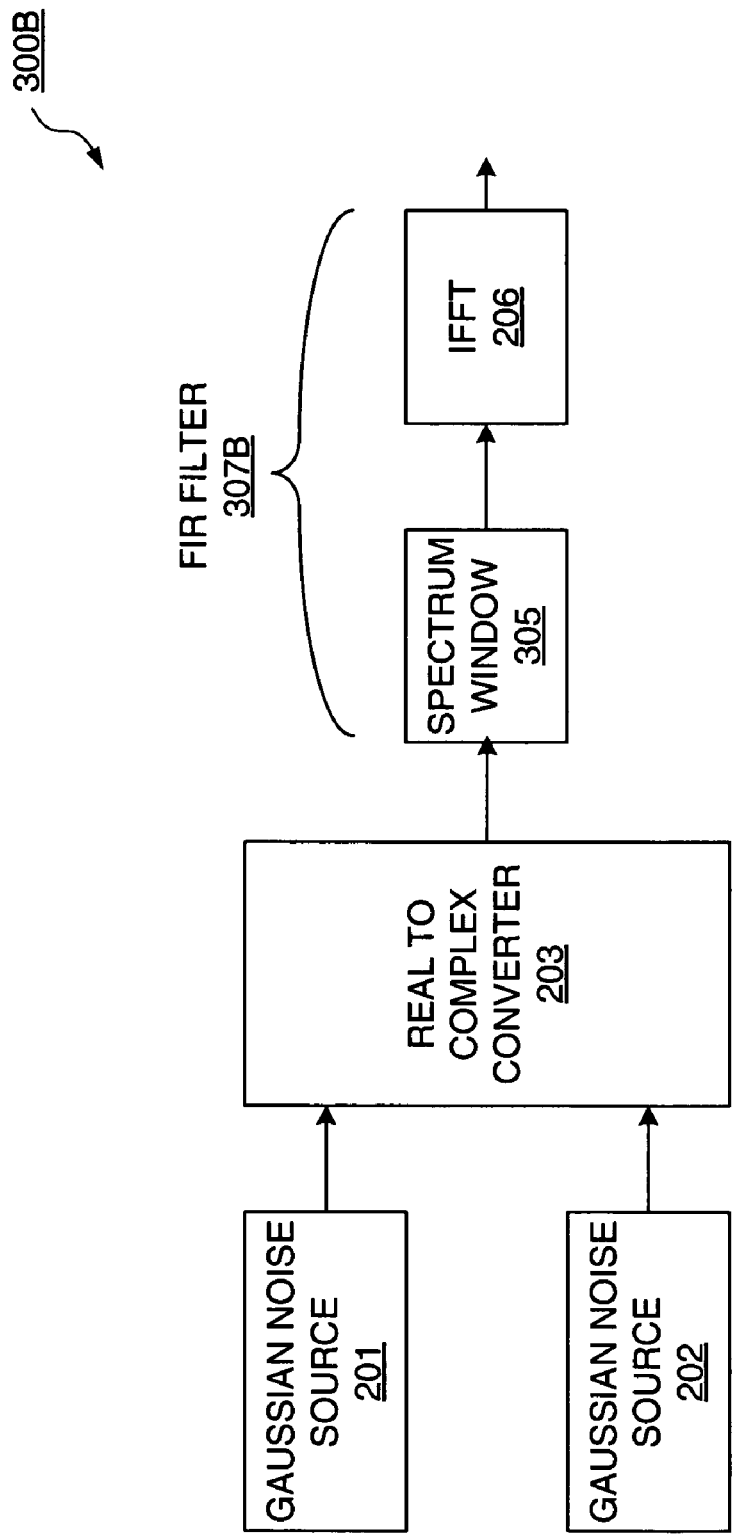

Output of scaler 304 provided to spectrum window 205 may be to bins equal to the number of samples used for multiplying each sample by a constant of the associated bin. Thus, for example, spectrum window 205 may be implemented with a memory having 64 constants for correspondingly multiplying 64 sample points of scaled complex samples. Each bin in spectrum window 305 may be configured to provide this multiplication for scaling. FIG. 3B is a block diagram depicting an alternate exemplary embodiment of a noise filtering system 300B. In noise filtering system 300B, scaler 304 of FIG. 3A is effectively merged into spectrum window 305 of FIR filter 307B.

Figure 3C:
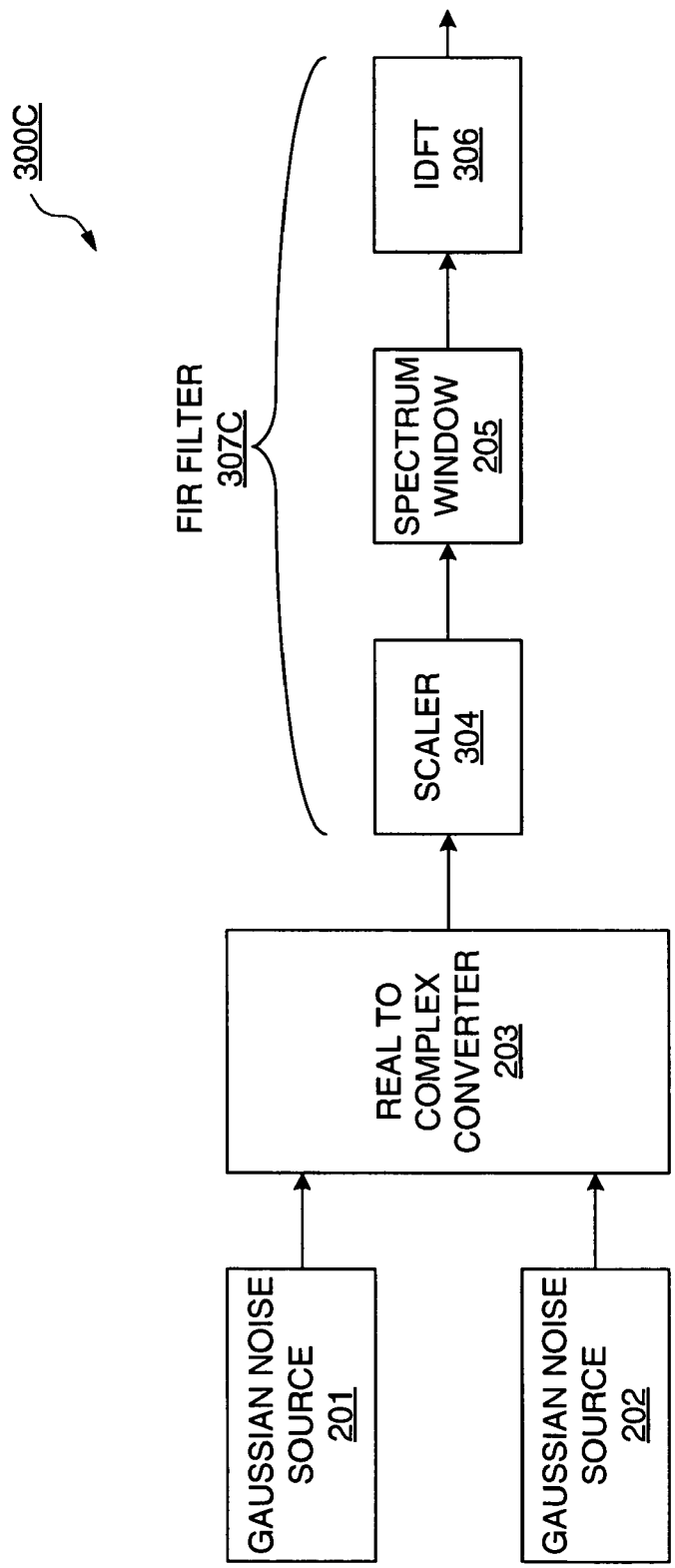
Figure 3D:
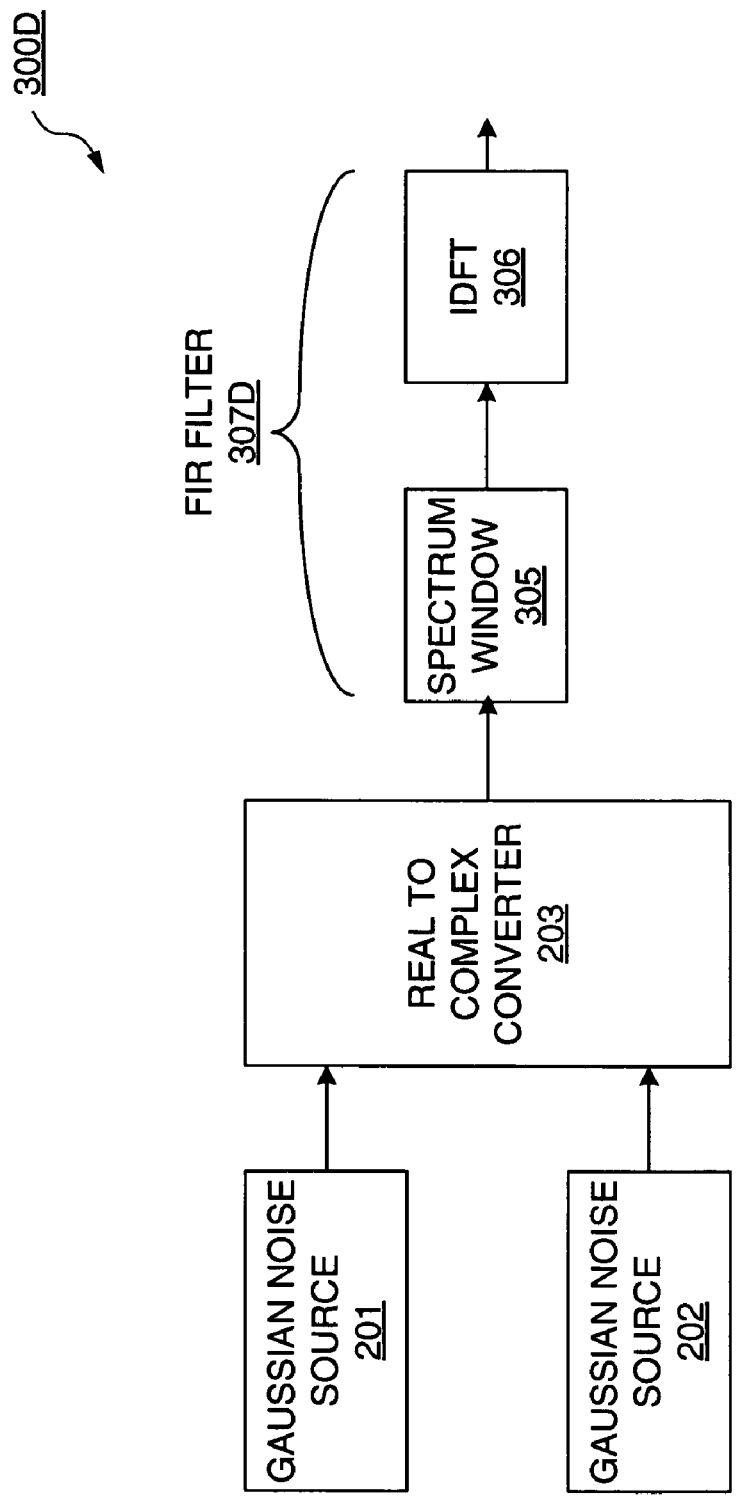

Conventionally, spectrums are normalized to a maximum Doppler frequency. Hence, spectrums are limited to being less than or equal to the maximum Doppler frequency, and limited by the number of sampling points. In order to provide a more accurate approximation of values between points, an IFFT done by IFFT block 206 may zero pad the windowed noise output from spectrum window 205. For example, windowed noise may be zero padded up to 8,192 points by IFFT block 206. Output of IFFT block 206 due to zero padding may be an interpolated and heavily band-limited output signal. As is well known, the Doppler frequency is substantially less than the channel rate of an integrated circuit, and thus such zero padding is used. Zero padding means that the input to IFFT block 206 only has M samples, such as 64 samples in the above example, which may be non-zero. Accordingly, the computational advantage of an IFFT over an Inverse Discrete Fourier Transform ("IDFT") becomes insignificant. In FIGS. 3C and 3D, respective noise filtering systems 300C and 300D are illustratively shown where IFFT block 206 of FIGS. 3A and 3B has been replaced with an IDFT block 306. Thus, noise filtering system 300C of FIG. 3C is similar to noise filtering system 330A of FIG. 3A, but with IDFT block 306 substituted for IFFT block 206, and noise filtering system 300D is likewise similar to noise filtering system 300B of FIG. 3B, but with IDFT block 306 substituted for IFFT block 206. Replacing an IFFT block with an IDFT block allows each output value to be computed on an as needed basis without having to employ memory and allows an vector input to such IDFT to vary for each output to avoid output discontinuities, which avoids having to do an overlap-save or overlap-add to mitigate against such discontinuities as described above. Noise filtering system 300C or 300D may be modeled according to:

$$h_1(n) = \frac{1}{N} \sum_{k=-\frac{M}{2}}^{\frac{M}{2}-1} (X_k + jY_k) S_k W_N^{-kn}, \quad (2)$$

where $h_1(n)$ are channel coefficients as a function of output sample number (n). N is the number of points in an IDFT, for example 8,192 in the above example. M is the number of active points in an IDFT, for example 64 in the above example. $S_k$ is an M point discrete spectrum, namely the selected spectrum sampled at M points across the target Doppler bandwidth.

Thus, it should be appreciated that an IFFT, which batches processes using intermediate results such as batch processing 8,192 points in the above example, is not the same as an IDFT, which does not use intermediate results. Rather in an IDFT, each of the samples, such as 64 samples in the above example, is multiplied by a complex exponential. These points can change throughout an IDFT, as intermediate results are not used. Notably, in an IDFT, the result of each of the multiplications is summed to provide the output.

Figure 4A:
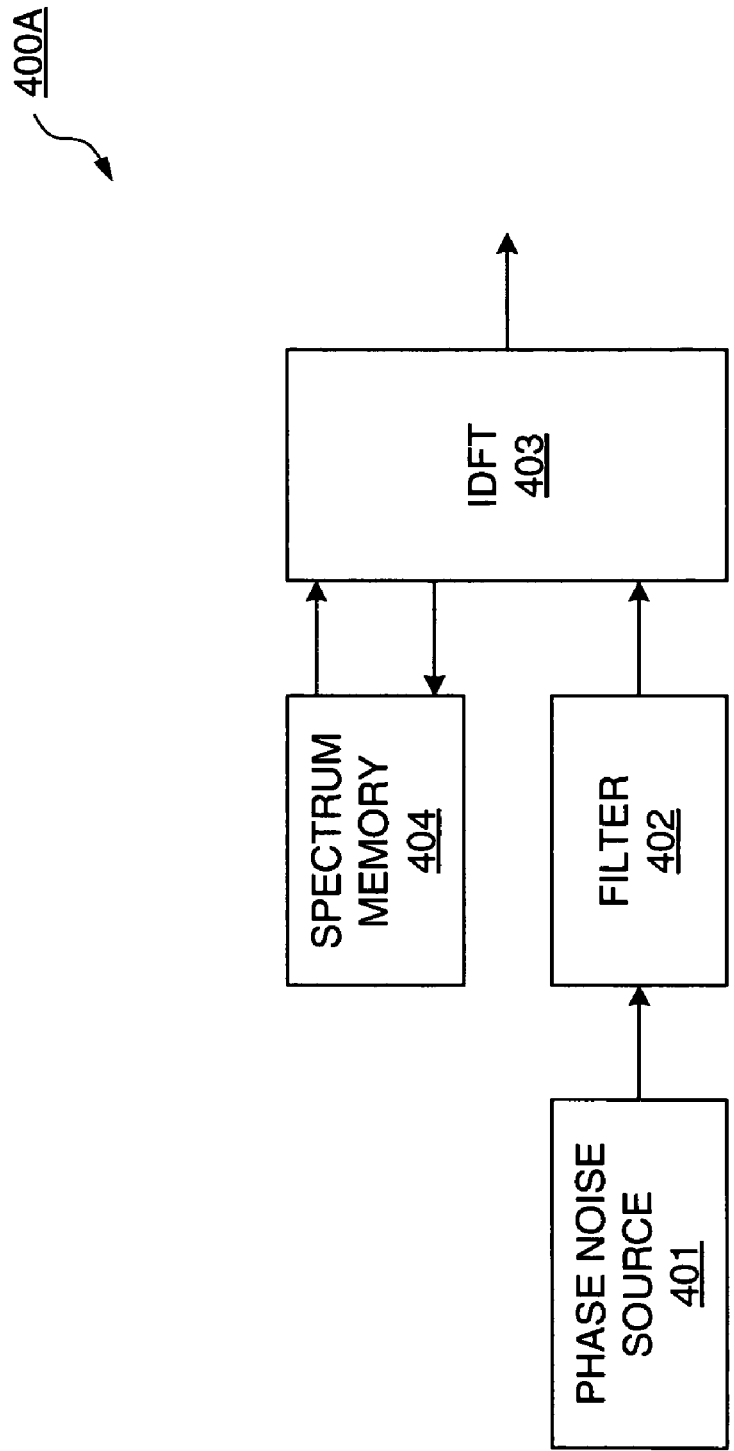

FIG. 4A is a block diagram depicting an exemplary embodiment of a noise filtering system 400A. One difference of noise filtering system 400A from the above-described noise filtering systems is that a spectrum memory 404 is used to replace a spectrum window. Another difference is that the Gaussian noise sources as described above are replaced with a phase noise source 401. Notably, noise filtering system 400A is a coefficient generator, which may be used as a FIR. Phase noise source 401 may be for providing a single uniform phase noise for twiddle factors of IDFT block 403. A filter 402 may be interposed between the output of phase noise source 401 and the input to IDFT block 403 to ensure noise within a targeted band.

Spectrum memory 404 may store coefficients at respective addresses. Accordingly, spectrum memory 404 may be implemented using a type of read-only memory. In the above example, 64 coefficients may be stored for each harmonic. There may be, for example, a number of harmonics which in the above example may be 64. An address, which is output from IDFT block 403 to spectrum memory 404, is used to read out a coefficient. This address may be thought of as being k in Equation 3 below. Accordingly, the address may be incremented sequentially to output each coefficient. These coefficients are then used as output from spectrum memory 404 to IDFT block 403 for multiplication in IDFT block 403, in contrast to having such multiplication done in a spectrum window, as previously described. Notably, M may go from −32 to 31 in integer steps, for providing 64 addresses. If the spectrum is symmetrical, an optimization may be used where only one side of the spectrum values, such as 0 to 31, for M are employed. However, as is known, Doppler shift when moving toward an object, such as toward an antenna for example, is different than when moving away from an object. Movement toward an object may introduce a negative Doppler shift resulting in an impulse response, which may be asymmetrical with respect to a discrete spectrum.

Noise filtering system 400A may be mathematically modeled according to:

$$h_2(n) = \frac{1}{N} \sum_{k=-\frac{M}{2}}^{\frac{M}{2}-1} S_k W_N^{-(kn+Z_k)}, \quad (3)$$

where $h_2(n)$ are channel coefficients as a function of outputs sample number (n), and $Z_k$ is uniform noise in 0 to N points. Again, using the Central Limit Theorem it should be understood that for M sufficiently large, output of noise filtering system 400A closely approximates output of noise filtering systems 300C and 300D of FIGS. 3C and 3D, respectively. Generally, M should be at least approximately equal to 64.

Figure 4B:
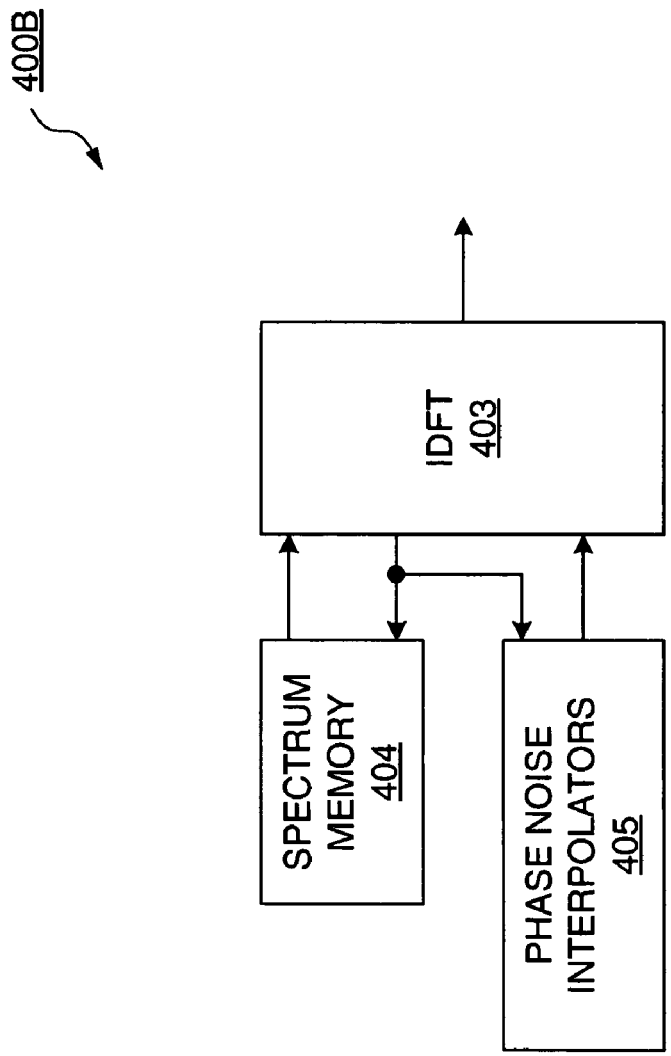

FIG. 4B is a block diagram depicting an alternative exemplary embodiment of a noise filtering system 400B. Noise filtering system 400B replaces phase noise source 401 and filter 402 of FIG. 4A with phase noise interpolators 405. Notably, noise filtering system 400B is a coefficient generator, which may be used as a FIR. IDFT 403 provides an address to both spectrum memory 404 and phase noise interpolators 405. Notably, a single noise filtering system 400B may be implemented for handling multiple paths by using time multiplexing.

With reference to FIGS. 4A and 4B, it should be appreciated that in noise filtering systems 400A and 400B, sums of sinusoids may be modeled where the spectrum is obtained from amplitude modulation in contrast to frequency modulation as in a Jakes simulator and derivatives thereof. Continuing the above example, each IDFT 403 of noise filtering system 400A and 400B may be an 8,192 point IDFT.

It should be appreciated that filter 402 band limits input to IDFT 403 to the maximum Doppler frequency to prevent corruption of a target power spectrum. In contrast to M uniform phase noise sources 401 per path as in FIG. 4A, where each noise sample for each path may implement an interpolation filter, a single time multiplexed linear interpolator may be used as generally indicated in FIG. 4B. Because phase noise is band limited to a maximum Doppler frequency, the rate of change between interpolation points is also limited. The rate of change may be mathematically expressed as:

$$u_n = u_{n-1} + \Delta u, \quad (4)$$

where $u_n$ is the interpolated result at sample number n, and $\Delta u$ is the uniform rate of change. Notably, the rate of change being band limited only changes every N samples. If $\Delta u$ is less than or equal to 1, and the rate of update, namely changes of $\Delta u$ which is in effect the rate of change of a rate of change, is no more than once every N samples, then phase noise is band limited to the Doppler frequency (i.e., $\Delta u$ is the cause, band limited noise is the effect). Thus, an interpolated result, namely $u_n$, may be treated as a phase accumulation acted upon by a randomized phase increment, namely $\Delta u$. Accordingly, it should be appreciated that phase noise is modulo N, and thus an accumulator, described below, used for an IDFT may need only a sufficient number of bits for lossless integration over $\Delta u$ for the full number of N cycles of each IDFT. For example, for n equal to 8,192, 13 bits (i.e., $\log_2 N$) for each increment and 26 bits (i.e., $2 \log_2 N$) for each accumulator may be used. Thus, noise filtering system 400B of FIG. 4 may be mathematically modeled as:

$$h_2(n) = \frac{1}{N} \sum_{k=-\frac{M}{2}}^{\frac{M}{2}-1} S_k W_N^{-(z_{k,n-1}+[k+\Delta z_k]n)}, \quad (5)$$

where $z_{k,n-1}$ is a value for source noise k at a previous sample number and $\Delta z_k$ is the rate of change for source noise k. Thus, $\Delta z_k$ appears as a dither term for each IDFT oscillator frequency.

Figure 5:
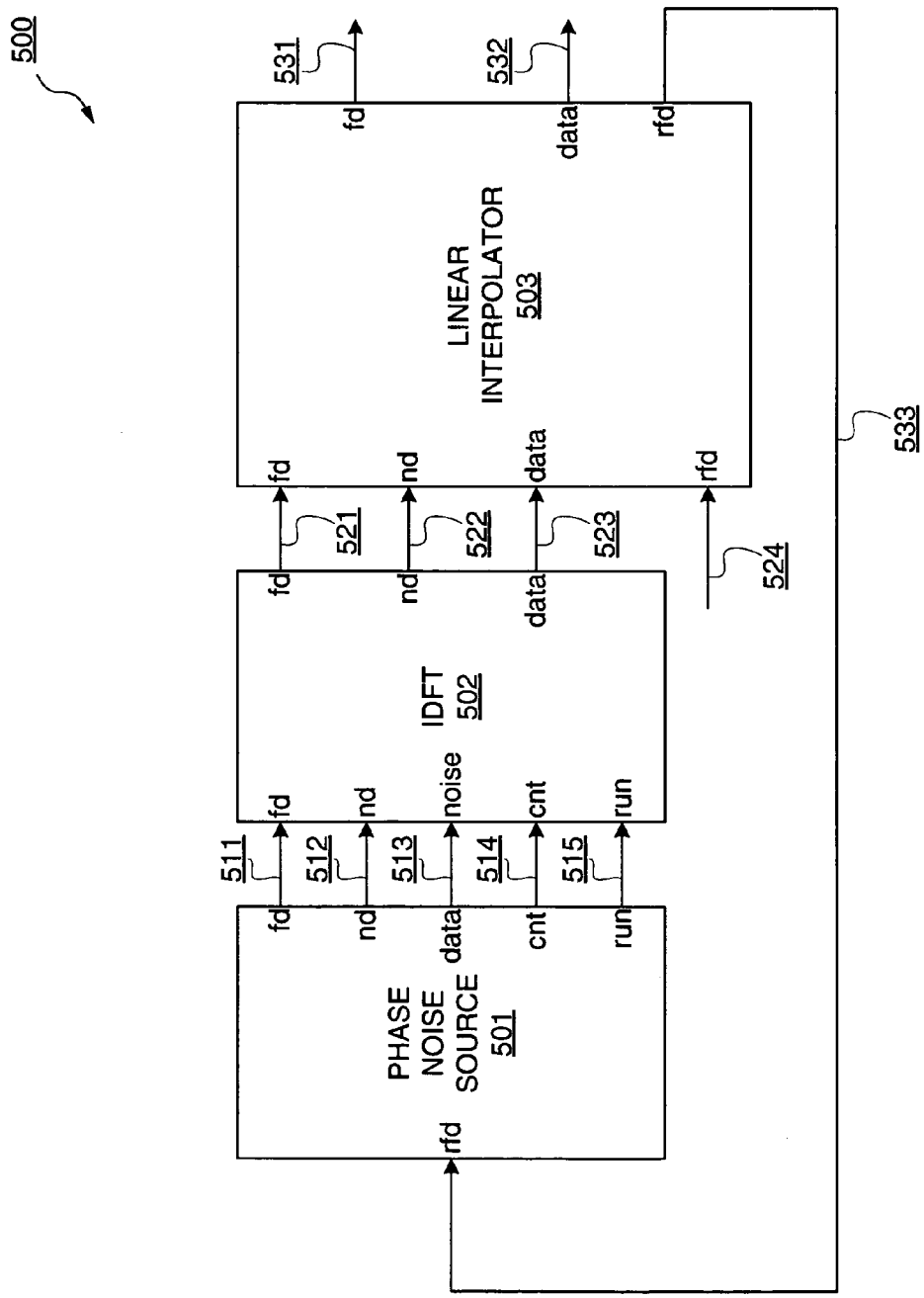

FIG. 5 is a block diagram depicting an exemplary embodiment of a noise filtering system 500. Noise filtering system 500 is an exemplary implementation of noise filtering system 400B of FIG. 4B where spectrum memory 404 and phase noise interpolators have been incorporated into phase noise source 501 and linear interpolator 503. Phase noise source 501 is coupled to provide outputs 511 through 515 to IDFT block 502. Outputs 511 through 515 respectively, are start of frame data ("fd"), new data ("nd"), data, count ("cnt"), and run. Notably, fd generally is a start of data signal, and for this particular example of processing data in frames for an FPGA, fd is a handshaking signal indicating the start of a frame of samples. Also, for an FPGA implementation nd is a handshaking signal indicating that a next sample is valid, and more generally may be thought of as a data strobe signal. Accordingly, fd signal 511 and nd signal 512 may be used to periodically strobe IDFT block 502. Notably, data output from phase noise source 501 as data signal 513 is input to IDFT block 502 as noise. Responsive to input signals 511 through 515, IDFT block 502 provides output signals 521 through 523 for fd, nd, and data, respectively.

Input signals 521 through 523 from IDFT block 502 to linear interpolator 503, as well as a request first data ("rfd") input signal 524 to linear interpolator 503, are used to provide outputs 531 through 533 for fd, data, and rfd, respectively. Notably, rfd output signal 533 is provided as feedback rfd input to phase noise source 501. For an FPGA implementation, rfd is a strobe that indicates first data is to be obtained for a next block of data.

Figure 6:
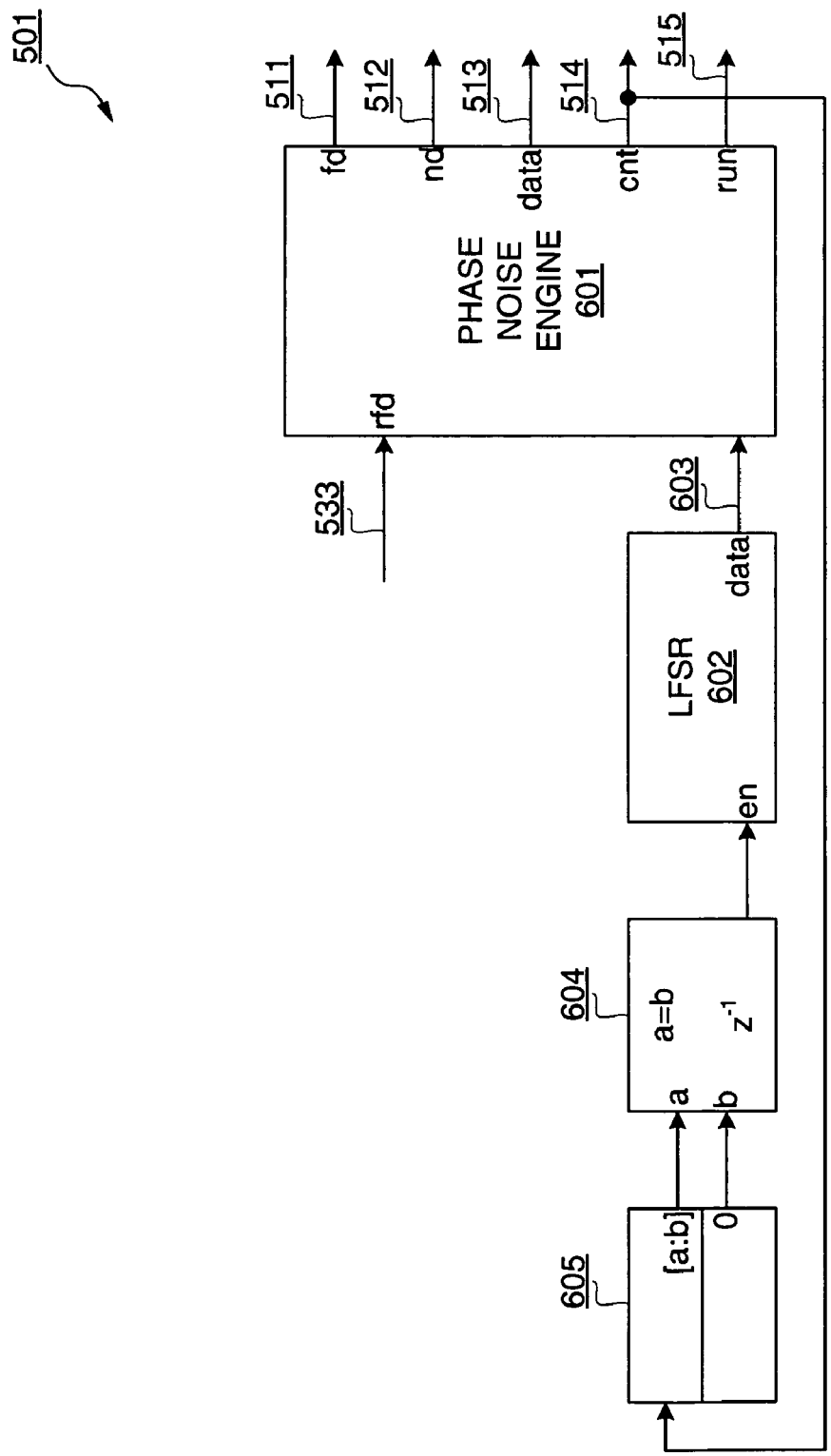
FIG. 6 is a block diagram depicting an exemplary implementation of a phase noise source of the noise filtering system of FIG. 5.

With continuing reference to FIG. 5, FIG. 6 is a block diagram depicting an exemplary implementation of phase noise source 501. Phase noise engine 601 is configured to provide outputs 511 through 515. Count output signal 514 is provided as a feedback signal to logic block 605. For an FPGA implementation, logic block 605 may be a System Generator splice block [a:b] to output log 2(2M) Least Significant Bits ("LSBs") of a count. Outputs from logic block 605 are provided to logic block 604. For values a=b, where a is LSBs of a count of count output signal 514 and b is a constant logic zero, input is to port a of logic block 604. For values a≠b, a logic 0 is input to a port b of logic block 604. Output of logic block 604 is provided as an enable signal to linear feedback shift register ("LFSR") 602. LFSR 602 is therefore enabled when log 2(2M) LSBs of a count of count output signal 514 are zero. This may correspond to once per radio path, namely, a new uniform random number may be available for each radio path. This may be used to ensure that each path is independent. Phase noise engine 601 uses 2M cycles for each radio path.

Output of linear feedback shift register 602 provides noise data via data output signal 603 to phase noise engine 601. Linear feedback shift register 602 need not be linear, but may be another form. In other words, the interpolation need not be linear, and thus may be a non-linear interpolation. Moreover, a "leap forward" linear feedback shift register may be used to generate random bits for noise for a multiple-bit output that is uniform. A leap forward LFSR may be used to provide a 2 log 2[N] uniform random number, which in this example is a 26 bit random number, for every radio path. If a straight LFSR is used, namely one that only gives a single bit uniform random output, then, for the example, 26 outputs may be collected to form a uniform 26 bit number. Phase noise engine 601 is coupled to receive rfd feedback signal 533 from linear interpolator 503.

Figure 7:
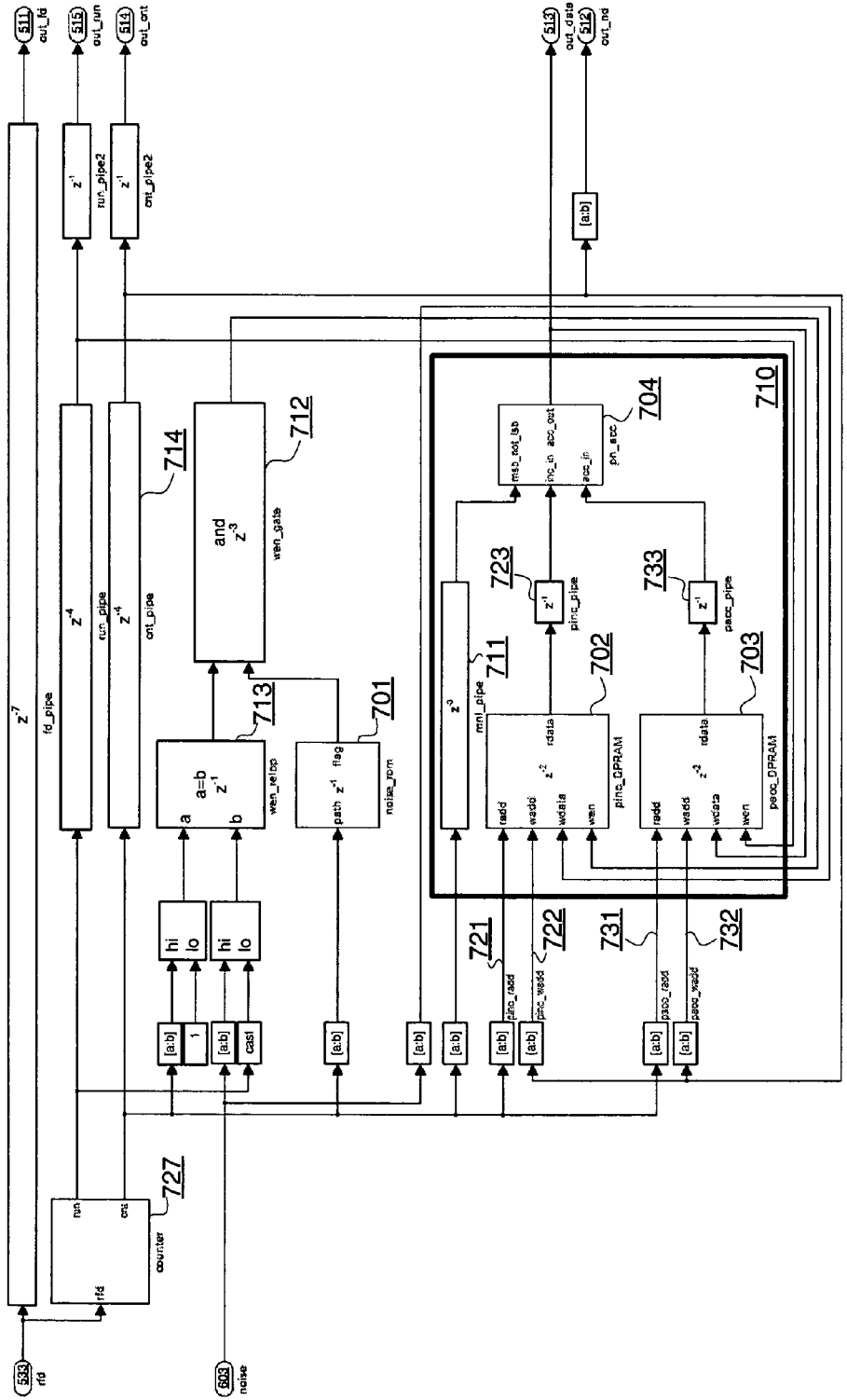
FIG. 7 is a block/schematic diagram depicting an exemplary implementation of a phase noise engine of the phase noise source of FIG. 6.

FIG. 7 is a block/schematic diagram depicting an exemplary implementation of phase noise engine 601 of FIG. 6. Phase noise engine 601 includes phase increment memory 702 and phase accumulator memory 703. Notably, for an FPGA implementation, BRAMs may be used for memories 702 and 703 and may be initialized as part of configuring an FPGA. However, for an ASIC or other type of integrated circuit, an initialization signal (not shown) may be used to initialize memory with data.

Phase increment memory 702 receives phase increment read address signal 721 and phase increment write address signal 722. Address signals 721 and 722 are read and write pointers, respectively. Data read from phase increment memory 702 is provided to phase increment pipe 723, and output of phase increment pipe 723 is provided as an increment input to phase noise accumulator 704.

Phase accumulator memory 703 receives phase accumulator read address signal 731 and phase accumulator write address signal 732 as respective read and write pointers. Read data output from phase accumulator memory 703 is provided to phase accumulator pipe 733, and output from phase accumulator pipe 733 is provided as an accumulator input to phase noise accumulator 704.

Accumulated output of phase noise accumulator 704 is provided as data signal 513 to IDFT block 502 of FIG. 5, as well as being fed back to phase accumulator memory 703 as write data. Phase accumulators are 2 log 2(N) bits wide, and the phase increments are log 2(N) bits wide. As the IDFT calculates real and imaginary outputs on successive clocks (i.e., time interleaved), two cycles are used to generate each noise output. To save resources, the accumulations may be split into two separate parts. For the first part, the phase increment may be added to the LSBs of phase accumulate with the carry-out stored or latched. For the second part, the carry may be added to the MSBs of phase accumulate. So for the above example, a 26 bit addition is split into two 13 bit additions using the same hardware. Accordingly, Equation 4 for adding $\Delta u$ to a $u_{n-1}$ value may be implemented as described above.

Another port of phase noise accumulator 704 is for receiving the Most Significant Bits ("MSBs"), but not the LSBs, of phase noise from mnl pipe 711. Notably, phase increment memory 702, phase increment pipe 723, phase accumulator memory 703, phase accumulator pipe 733, mnl pipe 711, and phase noise accumulator 704 may collectively be described as phase noise block 710. In this configuration, phase noise accumulator 704 knows when it is adding LSBs, such as using phase increment and stored carry bits, or MSBs, such as when using a previous carry.

In the above example, all 64 values for a path may be stored in memories 702 and 703, respectively. For more than one path, there would be a set of values for each. Thus, in the above example, there may be 64 values multiplied by the number of paths stored in memories 702 and 703. Of course, width of read and write pointers may be scaled relative to the size of memories 702 and 703. More particularly, phase accumulator memory 703 stores 2N values, as LSBs and MSBs are stored in successive memory locations. Thus, these bits are treated as bit pairs.

Noise memory 701 is distinct from an above described spectrum read-only memory ("ROM"). A spectrum ROM may hold the shape of each spectrum for each radio path, and a noise ROM, for example, indicates whether a radio path uses phase noise for each radio path. Notably, some spectrums do not actually use phase noise, such as for example impulse spectrums, which are entirely deterministic. For such spectrums, phase increments may be initialized to zero. Again, this may be done with an FPGA configuration bitstream or with an initialization signal. Write enable generation to update such phase increments may be disabled. For example, noise memory 701 may be configured to provided a yes/no flag which is gated by write enable gate 712. Output of write enable gate 712 is provided as a write enable signal input to phase increment memory 702. Optionally, disabling phase increments causes phase noise block 710 to generate constant phase offsets for spectrums that do not use phase noise.

Other blocks of phase noise engine 601 include write enable operator ("wen_relop"; e.g., a comparator) 713 and count pipeline ("cnt_pipe") 714, among others which are not described in detail herein for purposes of clarity. Recall, phase increments may change every N samples or may change on average every N samples. LFSR 602 of FIG. 6 generates a 2 log 2(N) uniform number, which in this particular example is a 26 bit number. One half of 2 log 2(N) bits, or 13 bits for the example, is used as a potential new phase increment value at a wdata port of phase increment memory 702, and the other half of 2 log 2(N) bits is compared with the harmonic number from a counter 272. If the values for this comparison match, the new phase increment is written in to phase increment memory 702. The harmonic number is log 2(M) bits wide, which is fewer bits than half the noise input. This means the most significant log 2(N)-log 2(M) bits of noise are zero for the comparison output to be true. The result of this is that all M phase increments are updated (in a random manner) approximately every N samples.

Figure 8:
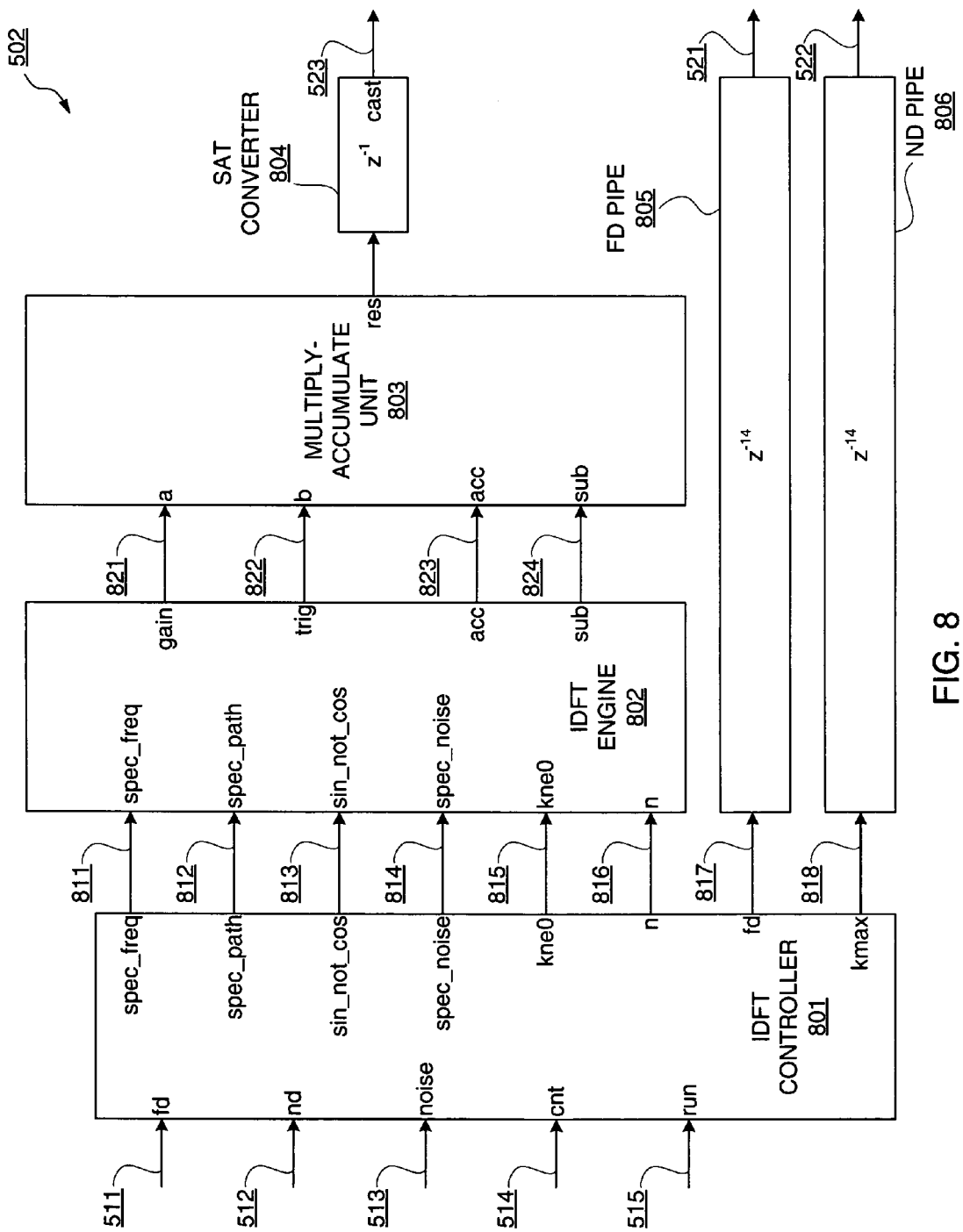
FIG. 8 is a block diagram depicting an exemplary implementation of an Inverse Discreet Fourier Transform ("IDFT") block of the noise filtering system of FIG. 5.

FIG. 8 is a block diagram depicting exemplary implementation of IDFT block 502 of FIG. 5. IDFT block 502 includes IDFT controller 801, IDFT engine 802, and multiply-accumulate unit 803, saturating ("SAT") converter 804, fd pipeline ("pipe") 805, and nd pipe 806. IDFT controller 801 receives input signals 511 through 515 from phase noise source 501. IDFT controller 801 is configured to provide output signals 811 through 818 to provide spectrum frequency, spectrum path, sine not cosine, spectrum noise, k not equal to zero ("kne0"), output sample number ("n"), fd, and k equal to maximum value ("kmax") signals, respectively. Notably, Boolean outputs indicate which elements in the IDFT are being summed. Although k goes from $-M/2$ to $M/2-1$ in mathematical terms, in this particular example of a hardware implementation k goes from 0 to M−1 for simplicity. IDFT engine 802 receives input signals 811 through 816 and is configured to provide output signals 821 through 824, namely gain, trigger, accumulate, and subtract signals, respectively, to multiply-accumulate ("mac") unit 803. Output from IDFT engine 802 feeds multiply-accumulate unit 803 for IDFT summation. Multiply-accumulate unit 803 is coupled to receive input signals 821 through 824 and configured to provide a result ("res") output signal to SAT converter 804, which is configured to provide a saturating arithmetic ("cast") output, namely, data signal 523. Multiply-accumulate unit 803 may be for fading channel modeling.

On rare occasions, output of multiply-accumulate unit 803 may be more bits wide than the bit width output of IDFT engine 802. Thus, multiply-accumulate unit 803 may output a value which is too large for IDFT engine 802 output format to represent. Saturating converter 804 clips these values to the maximum/minimum values possible to avoid this possible condition.

IDFT controller 801 provides output signal 817 to fd pipe 805, which is configured to provide fd output signal 521 to linear interpolator 503 of FIG. 5. IDFT controller 801 provides output signal 818 to nd pipe 806, which is configured to provide nd signal 522 to linear interpolator 503.

Figure 9:
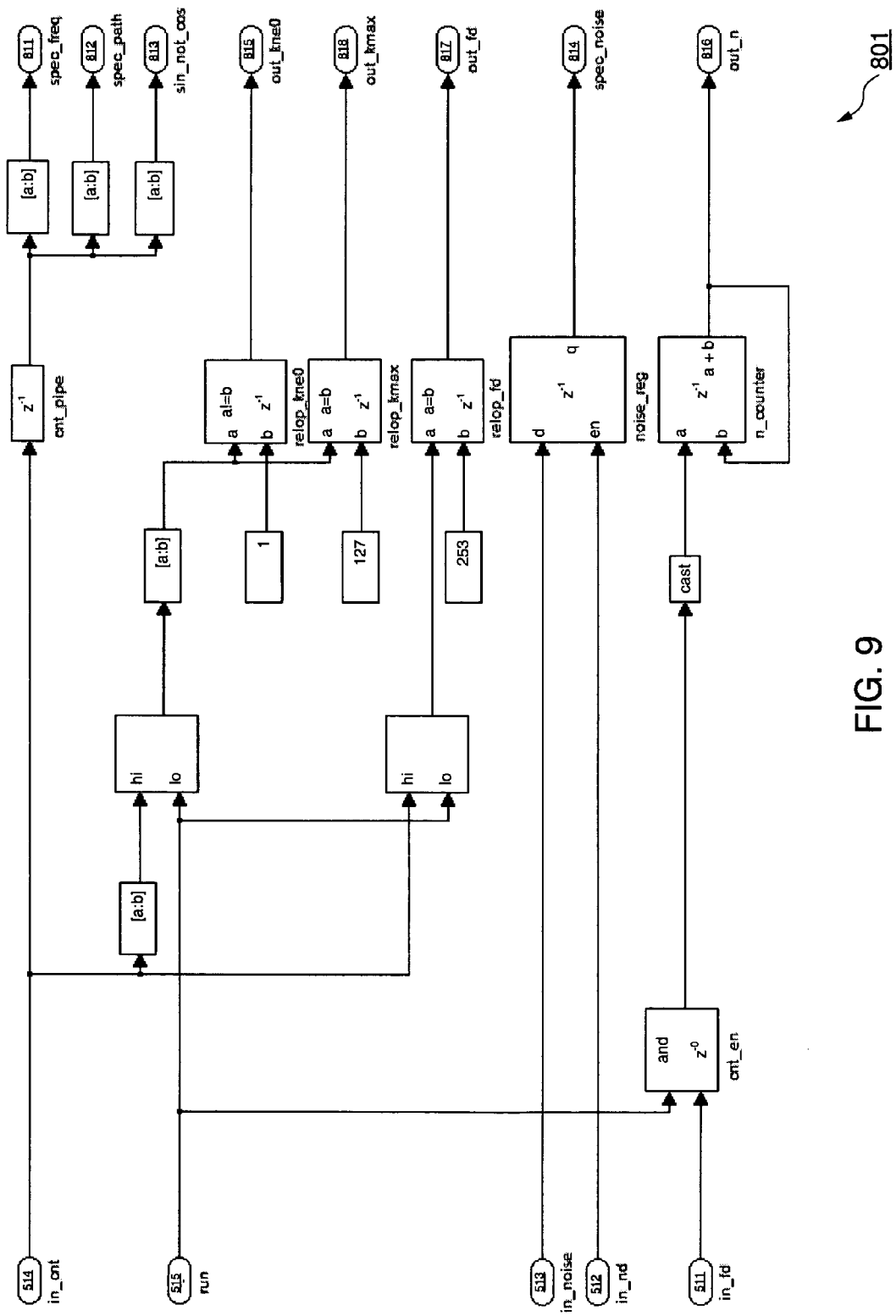
FIG. 9 is a block/schematic diagram depicting an exemplary implementation of an IDFT controller of the IDFT block of FIG. 8.
Figure 10:
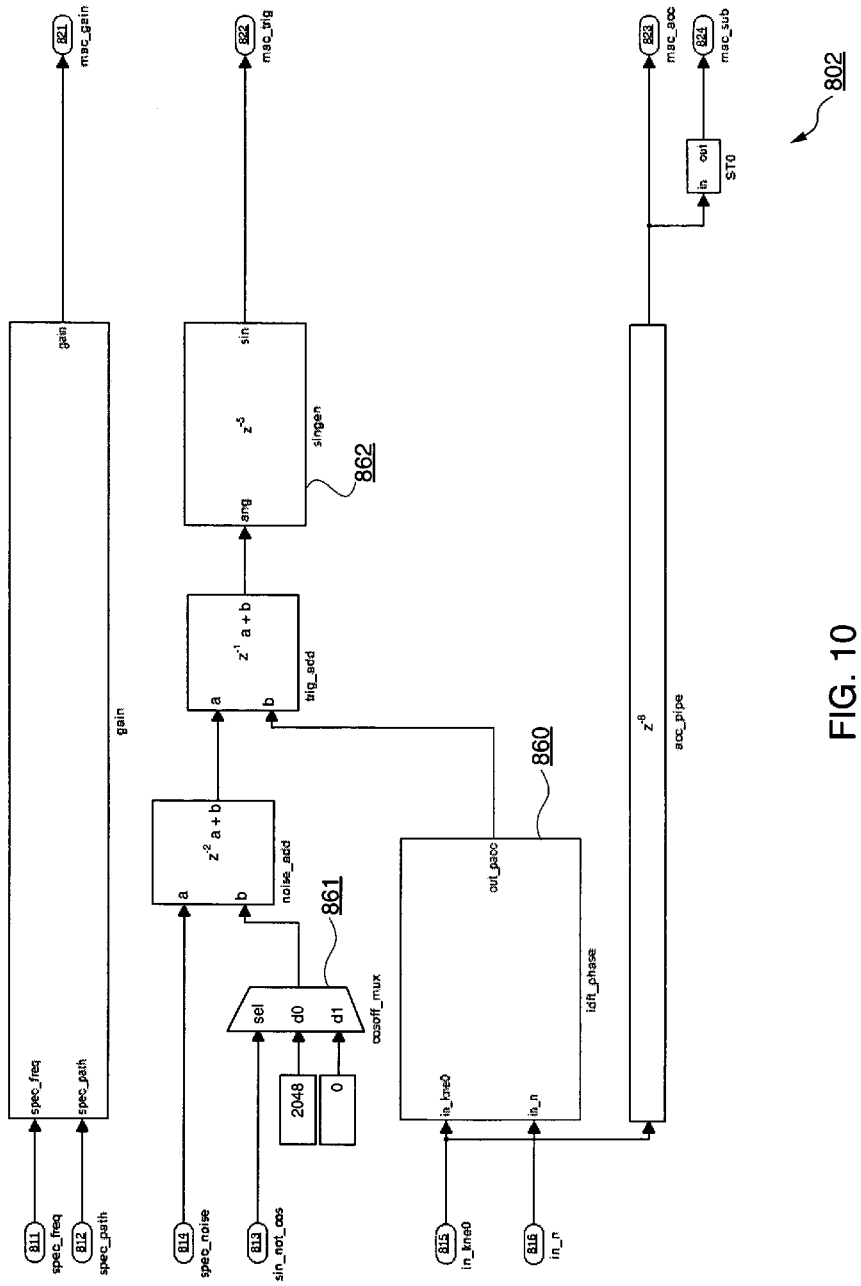
FIG. 10 is a block/schematic diagram depicting an exemplary implementation of an IDFT engine of the IDFT block of FIG. 8.

FIG. 9 is a block/schematic diagram depicting an exemplary implementation of IDFT controller 801 of FIG. 8. Notably, though specific numerical examples are used for values of b, other values may be used depending upon the application. FIG. 10 is a block/schematic diagram depicting an exemplary implementation of IDFT engine 802 of FIG. 8. IDFT engine 802 includes IDFT phase block 860 which is configured to generate a $k_n$ term of an IDFT. Phase noise, namely the $z_k$ term of an IDFT, is added to accumulated phase output from IDFT phase block 860, again namely the $k_n$ term of an IDFT. Cosine offset multiplexer 861 is configured to generate an offset to allow sine generator ("singen") block 862 to alternate between sine and cosine generation. Notably, uniform phase noise plus a phase offset yields $z_k$ of W, where W is a complex sinusoid generally of the form of cosine plus j sine. Again, a sum of independent variables on a generally uniform source yields a Gaussian output. In short, it should be appreciated that phase noise is added to phase count to provide sine and cosine pointers.

Figure 11:
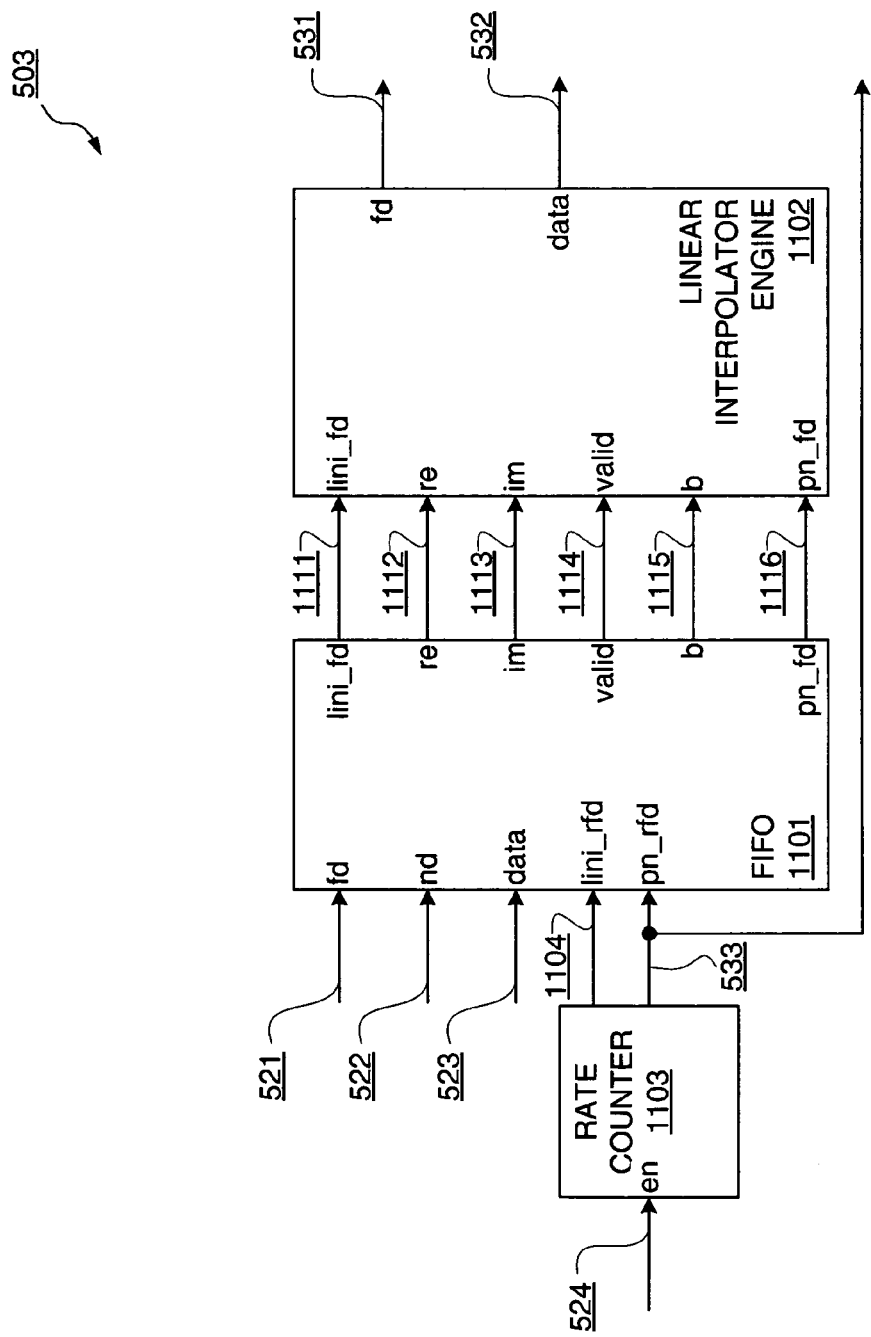
FIG. 11 is a block diagram depicting an exemplary implementation of a linear interpolator.

FIG. 11 is a block diagram depicting an exemplary implementation of linear interpolator 503 of FIG. 5. Linear interpolator 503 includes rate counter 1103, first-in, first-out buffer ("FIFO") 1101, and linear interpolator engine 1102. Rate counter 1103 receives rfd signal 524 as an enable signal and provides linear interpolator ("lini") rfd signal 1104 and rfd feedback signal 533 to FIFO 1101. Feedback signal 533, output from rate counter 1103, is input to FIFO 1101 as a phase noise ("pn") rfd input. Notably, as described above, rfd feedback signal 533 is also provided to phase noise source 501 of FIG. 5. FIFO 1101 is coupled to receive input signals 521 through 523 from IDFT block 502 of FIG. 5. FIFO 1101 is configured to provide output signals 1111 through 1116, namely, a linear interpolator fd signal, a real value signal, an imaginary value signal, a valid signal, a b value signal, and a pn fd signal, respectively. Linear interpolator engine 1102 is coupled to receive input signals 1111 through 1116 and configured to provide output signals 531 and 532.

Linear interpolator engine 1102 uses both current and previous sets of IDFT outputs as stored in FIFO 1101. Notably, FIFO 1101 may act as an interface between linear interpolator engine 1102 of an IDFT coefficient generator, such as of FIG. 4A or 4B, which is running at a channel rate, and any other IDFT coefficient generators running at a rate much slower than the channel rate.

Accordingly, it should be appreciated that the channel modeling described above may be used for modeling: direct line-of-sight ("LOS") paths; a channel with sub-paths each with different lengths which may lead to constructive or destructive interference, or a combination thereof; a Classic Doppler spectrum; a Rounded spectrum; frequency selective or frequency flat channels (e.g., where time delay between each sub-path is less than the symbol rate of a communications system); or an impulse response spectrum, among other known types of channels. Notably, a Multipath Fading Channel Model ("MFCM") architecture with a coefficient generator as described herein may be implemented in an FPGA for real-time simulation. An application known as "System Generator" available from Xilinx, Inc. of San Jose, Calif. may be used for such implementation. Examples of phenomena that may be simulated using channel modeling as described herein include Rician fading and Rayleigh fading. More generally, systems operating with channels having one or more no-line-of-sight ("NLOS") conditions may be simulated.

A user of a MFCM architecture may input the type of spectrum via, for example, path spectrum vector type indicating the type of spectrum to be simulated, such as a null path, impulse, Classic, or Rounded spectrum, for example. Additionally, Doppler frequency, interpolation rate, and a spectrum frequency vector for specifying actual spectrum bandwidth for each path may be input by a user. Optionally, an external path read-only memory ("ROM") interface may be selected for user input of variables including a path delay vector specifying the delay in a number of samples for each path, a path gain vector specifying a linear gain for each path, a path ROM latency, a maximum length of a delay line used to implement a channel model, and a number of paths a channel model uses. Notably, the number of paths a channel model uses may be specified by a user or may be automatically calculated responsive to path vector parameters.

Figure 12:
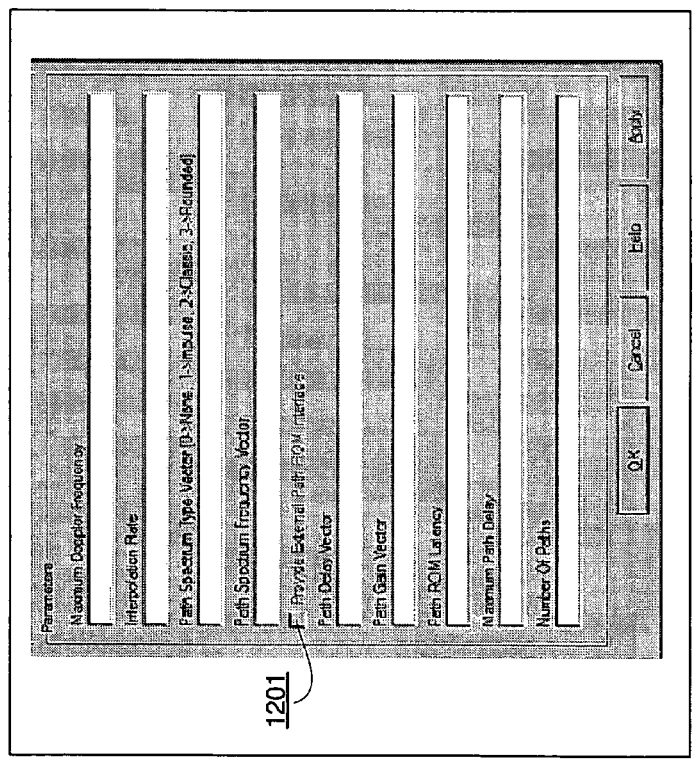
FIG. 12 is a display screen diagram depicting an exemplary embodiment of a Multipath Fading Channel Model ("MFCM") graphical user interface for inputting one or more variables.

FIG. 12 is a display screen diagram depicting an exemplary embodiment of an MFCM graphical user interface ("GUI") 1200 for inputting one or more of the above-described variables. Again, responsive to an option to select an external path ROM interface 1201, a path delay vector, a path gain vector, a path ROM latency, a maximum path delay, or a number of paths, or a combination thereof, may be specified.

Figure 13:
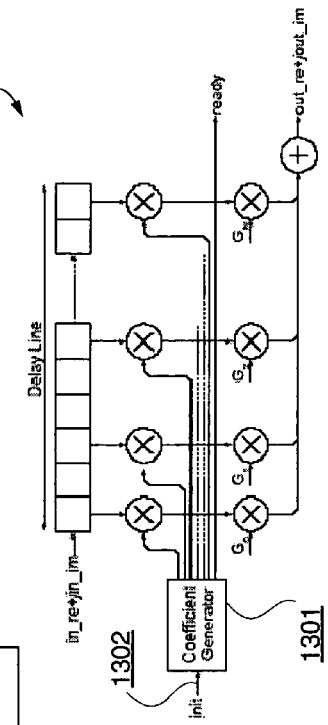
FIG. 13 is a block/schematic diagram depicting an exemplary embodiment of an MFCM architecture.

FIG. 13 is a block/schematic diagram depicting an exemplary embodiment of an MFCM architecture 1300. MFCM architecture 1300 includes coefficient generator 1301 as described herein. Additionally, as described herein, an optional initialization signal 1302 may be used, or alternatively, coefficient generator 1301 may be initialized during configuration of an FPGA used to instantiate coefficient generator 1301.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners.

What is claimed is:

1. A coefficient generator for channel modeling, comprising:
    memory for storing sets of constants for respective harmonics;
    at least one phase noise source configured for generating phase noise; and
    an Inverse Fourier Transform block coupled to the memory and to the at least one phase noise source, the Inverse Fourier Transform block configured to provide a read address to the memory for accessing at least one constant of a set of constants of the sets of constants from the memory, the Inverse Fourier Transform block coupled to receive the phase noise from the at least one phase noise source.

2. The coefficient generator according to claim 1, wherein the at least one phase noise source is at least one phase noise interpolator.

3. The coefficient generator according to claim 2, wherein the at least one phase noise interpolator is coupled to receive the read address from the Inverse Fourier Transform block and configured to provide the phase noise responsive to the read address.

4. The coefficient generator according to claim 3, wherein the phase noise interpolator includes an interpolator coupled to a phase noise block, the phase noise block having a phase noise engine coupled to a linear feedback shift register.

5. The coefficient generator according to claim 4, wherein the Inverse Fourier Transform block is configured to provide an Inverse Discrete Fourier Transform.

6. The coefficient generator according to claim 5, wherein the Inverse Fourier Transform block includes a controller, an Inverse Discrete Fourier Transform engine and a multiply-accumulate unit.

7. The coefficient generator according to claim 5, wherein the interpolator includes a rate counter, a first-in first-out buffer, and a linear interpolation engine.

8. The coefficient generator according to claim 5, wherein the memory is initialized with the sets of constants responsive to a configuration bitstream for configuring a Field Programmable Gate Array.

9. The coefficient generator according to claim 1, wherein the at least one phase noise source is coupled to the Inverse Fourier Transform block via a filter.

10. The coefficient generator according to claim 9, wherein the filter is a band pass filter configured for a Doppler frequency.

11. The coefficient generator according to claim 10, wherein the at least one phase noise source is at least one uniform phase noise source.

12. A method for generating coefficients for channel modeling, comprising:
    instantiating a coefficient generator in an integrated circuit having programmable logic, the instantiating including programming the programmable logic;
    generating phase noise;
    filtering the phase noise to band pass a portion of the phase noise responsive to a Doppler frequency;
    obtaining constants from memory, the constants obtained for respective sample points of a harmonic; and
    performing an Inverse Discrete Fourier Transform responsive to the filtered phase noise and the constants.

13. The method according to claim 12, further comprising initializing the memory with the constants, the constants being part of a configuration bitstream used for configuration of the programmable logic to instantiate the coefficient generator.

14. The method according to claim 13, wherein the memory is block random access memory of a Field Programmable Gate Array.

15. A method for generating coefficients for channel modeling, comprising:
    instantiating a coefficient generator in a programmable device, the instantiating including programming programmable logic;
    generating phase noise;
    obtaining constants from memory, the constants obtained for respective sample points of a harmonic;
    performing an Inverse Discrete Fourier Transform responsive to the phase noise and the constants to provide a noise-shaped response in a time domain; and
    interpolating the noise-shaped response between pairs of the sample points to provide a simulation of at least one channel in a communication system.

16. The method according to claim 15, further comprising initializing the memory with the constants, the constants being part of a configuration bitstream used for configuration of the programmable device to instantiate the coefficient generator.

17. The method according to claim 16, wherein the noise-shaped response is for a Doppler spectrum.

18. The method according to claim 16, wherein the noise-shaped response is for a Rounded spectrum.

19. The method according to claim 16, wherein the noise-shaped response is for an impulse response of a frequency selective channel or a frequency flat channel.

20. The method according to claim 16, wherein the noise-shaped response is for modeling multipath channel fading.

* * * * *